US010015632B2

(12) United States Patent
Sark et al.

(10) Patent No.: US 10,015,632 B2
(45) Date of Patent: Jul. 3, 2018

(54) PRECISE POSITIONING USING TIME OF ARRIVAL WITH PSEUDO-SYNCHRONIZED ANCHOR NODES

(71) Applicant: IHP GmbH—Innovations for High Performance Microelectronics/Leibniz-Institut fur Innovative Mikroelektronik, Frankfurt (Oder) (DE)

(72) Inventors: Vladica Sark, Frankfurt (DE); Eckhard Grass, Berlin (DE); Jesus Gutierrez Teran, Frankfurth (DE)

(73) Assignee: IHP—INNOVATIONS FOR HIGH PERFORMANCE MICROELECTRONICS/ LEIBNIZ-INSTIT FUR INNOVATIVE MIKROELEKTRONIK, Frankfurt (Oder) (DE)

( * ) Notice: Subject to any disclaimer, the term of this patent is extended or adjusted under 35 U.S.C. 154(b) by 0 days.

(21) Appl. No.: 15/696,506

(22) Filed: Sep. 6, 2017

(65) Prior Publication Data
US 2018/0132064 A1 May 10, 2018

(30) Foreign Application Priority Data

Sep. 9, 2016 (DE) .......................... 10 2016 217 277
Dec. 8, 2016 (DE) .......................... 10 2016 123 794

(51) Int. Cl.
*H04W 24/00* (2009.01)
*H04W 4/02* (2018.01)
(Continued)

(52) U.S. Cl.
CPC ............... *H04W 4/023* (2013.01); *G01S 5/06* (2013.01); *G01S 5/10* (2013.01); *H04W 4/06* (2013.01); *H04W 56/001* (2013.01)

(58) Field of Classification Search
CPC ...................................................... H04W 4/023
(Continued)

(56) References Cited

U.S. PATENT DOCUMENTS 6,054,950 A 4/2000 Fontana
2015/0156746 A1 6/2015 Horne et al.

FOREIGN PATENT DOCUMENTS

EP 2 703 832 A2 3/2014

OTHER PUBLICATIONS

Joseph Leva; "An Alternative Closed Form Solution to the GPS Pseudorange Equations"; Proc. of the Institute of Navigation (ION) National Technical Meeting, Anaheim, CA; Jan. 1995; pp. 269-275.
(Continued)

*Primary Examiner* — Joel Ajayi
(74) *Attorney, Agent, or Firm* — Ware, Fressola, Maguire & Barber LLP (57) ABSTRACT

A method of determining a position of at least one transceiver node comprises, anchor node by anchor node, transmitting respective positioning frames suitable for reception by a transceiver node and by the other anchor nodes. The transceiver node receives the positioning frames transmitted by the anchor nodes and ascertains respective times of reception for each. A solver stage determines the coordinates $(x_s, y_s, z_s)$ of the respective transceiver node and the time $t_s$ of transmission of the first positioning frame by an anchor node of first rank in the positioning sequence by numerically solving a non-linear system of at least five equations.

12 Claims, 2 Drawing Sheets

(51) Int. Cl.
  *G01S 5/10* (2006.01)
  *H04W 56/00* (2009.01)
  *H04W 4/06* (2009.01)
  *G01S 5/06* (2006.01)
(58) Field of Classification Search
  USPC .................................................... 455/456.5
  See application file for complete search history.

(56) References Cited

OTHER PUBLICATIONS

Stephen Bancroft; "An Algebraic Solution of the GPS Equations"; IEEE Transactions on Aerospace and Electronic Systems; vol. AES-21, No. 7; Jan. 1985; pp. 56-59.
James W. Chaffee, et al; "Bifurcation of Pseudorange Equations"; Proc. of the Institute of Navigation National Technical Meeting, San Francisco, CA; Jan. 1993; pp. 203-211.
Hyo-Sung Ahn, et al; "One-way Ranging Technique for CSS-based Indoor Localization"; The IEEE International Conference on Industrial Informatics, Daejeon, Korea; Jul. 13-16, 2008; pp. 1513-1518.
Yoon-Seok Nam, et al; "Wirelessly Synchronized One-Way Ranging Algorithm with Active Mobile Nodes"; ETRI Journal, vol. 31, No. 4; Aug. 2009; pp. 466-468.

PRECISE POSITIONING USING TIME OF ARRIVAL WITH PSEUDO-SYNCHRONIZED ANCHOR NODES

CROSS REFERENCE TO RELATED APPLICATION

This application claims priority under 35 USC § 119 to German Patent Application No. 102016217277.8 filed on Sep. 9, 2016 and German Patent Application No. 102016123794.9 filed on Dec. 8, 2016. Both applications are hereby incorporated by reference in their entirety.

TECHNICAL FIELD

The present invention is in the field of ranging, and in particular concerned with localization or positioning. More specifically, the invention relates to a method of determining a position of at least one transceiver node with respect to an at least two-dimensional coordinate space. It also relates to a transceiver node, to an anchor node for use in determining a position of at least one external transceiver node with respect to an at least two-dimensional coordinate space, and to a positioning arrangement for determining a position of at least one transceiver node with respect to an at least two-dimensional coordinate space.

BACKGROUND OF THE INVENTION

Precise positioning is of interest for indoor areas as well as outdoor areas where global navigation satellite system (GNSS) signals do not exist or have bad quality. Positioning techniques are often based on the use of wireless communication techniques.

For indoor systems, especially for Ultra-wide-band (UWB) based systems, the well-known Two-Way-Ranging (TWR) approach is a common choice. A main advantage of this approach is that there is no need for a fine synchronization between the stations performing the TWR.

Basically, TWR is performed between different nodes, which are also referred to as stations, in particular a transceiver node of unknown position and anchor nodes of known position. The transceiver node is a mobile device in many ranging or positioning applications. However, that is not a requirement. For two-dimensional positioning, at least three anchor nodes with known positions are required. For three-dimensional positioning, at least four anchor nodes with known positions are required. If more than the required minimum number of anchor nodes are present, the precision of positioning can be additionally improved. The number of anchor nodes can be reduced if additional constraints are introduced. Such constraints include known limitations of where the transceiver nodes can be.

However, TWR based methods do not cope well with a large number of mobile stations. Each mobile station has to perform TWR with the anchor nodes in order to estimate its position. For each TWR process, at least two transmissions are needed. In a multiuser scenario, where a lot of wireless mobile stations are present, an overall large number of transmissions are performed for positioning purposes. In a network which is also used for data communication, the transmissions needed for positioning thus introduce additional overhead in terms of channel usage. Depending on the number of users and the number of updates each user needs, the overhead can be substantial. This may require that the number of users allowed to make use of the positioning functionality is limited.

SUMMARY OF THE INVENTION

According to a first aspect of the present invention, a method of determining a position of at least one transceiver node with respect to an at least two-dimensional coordinate space is provided. The method comprises:

1.1 providing, at respective known spatial positions, at least three anchor nodes, 1.2 in performing a positioning sequence, anchor node by anchor node transmitting respective positioning frames suitable for reception by the at least one transceiver node and by at least one other of the anchor nodes, wherein the positioning sequence comprises a given anchor node transmitting a respective positioning frame for reception by at least that anchor node, which is the next anchor node in the positioning sequence, and by the at least one transceiver node, the next anchor node in the positioning sequence receiving the positioning frame from that anchor node, which is the preceding anchor node in the positioning sequence, and ascertaining a time of reception of the positioning frame, the next anchor node ascertaining, after transmitting its respective positioning frame, a respective forwarding time span ($T_{Fi}$) between the time of reception of the positioning frame from the preceding anchor node and the time of transmitting the its respective positioning frame;

1.3 the at least one transceiver node receiving the positioning frames transmitted by the anchor nodes and ascertaining respective times of reception for each of the received positioning frames;

1.4 providing to a solver stage for numerically solving a non-linear system of equations the following parameters:

of coordinates of the known positions of the anchor nodes performing the positioning sequence, a set of times of flight ($t_{tof(i-1)i}$) between pairs of respective anchor nodes of neighboring ranks ((i−1) and i) in the positioning sequence, using their known positions and a known propagation speed of the positioning frames, the respective times of reception of the respective positioning frames at the respective anchor nodes performing the positioning sequence, the respective forwarding time spans ($T_{Fi}$) ascertained by the respective anchor nodes performing the positioning sequence, and the respective times of reception of the respective positioning frames from the anchor nodes at the at least one transceiver node;

1.5 performing the solver stage, using the provided parameters, for determining the coordinates ($x_s$, $y_s$, $z_s$) of the respective transceiver node and the time $t_s$ of transmission of the first positioning frame by the anchor node of first rank in the positioning sequence by numerically solving a non-linear system of at least five equations, at least four equations of the nonlinear system using the relation $$t_n = t_s + \frac{1}{c}\sqrt{(x_n - x_s)^2 + (y_n - y_s)^2 + (z_n - z_s)^2} + t_{sn},$$

wherein $t_n$ is a time of reception of the respective positioning frame from a given anchor node of rank n in the positioning sequence at the at least one transceiver node, $x_n$, $y_n$, $z_n$ are the coordinates of the position of anchor node of rank n in the positioning sequence, $$t_{sn} = \Sigma_{i=2}^{n}(t_{tof(i-1)i} + T_{Fi})$$

$t_s$, to be determined by the solver engine, is a time of transmission of the positioning frame by the anchor node having the first rank in the positioning sequence, and
$x_s$, $y_s$, $z_s$, to be determined by the solver engine, are the coordinates of the transceiver node.

Preferably, the method additionally comprises the following additional steps:

1.6 performing a positioning extension sequence including:
  the determined time $t_s$ of transmission of the first positioning frame by the anchor node of first rank in the positioning sequence to the anchor nodes involved in the positioning sequence;
  after the positioning sequence has been performed by the anchor nodes, the at least one transceiver node broadcasting a broadcast positioning frame for reception by all anchor nodes;
  anchor nodes receiving the broadcast positioning frame from the transceiver node and ascertaining a respective time of its reception, using the time $t_s$ of transmission of the first positioning frame by the anchor node of first rank in the positioning sequence as a common reference point in time;
1.7 providing to a second solver stage for numerically solving a non-linear system of equations using the following parameters:
  sets of coordinates of the known positions of the anchor nodes performing the positioning sequence,
  the respective times of reception of the broadcast positioning frame at the respective anchor nodes, and
1.8 performing a second solver stage using the provided parameters, for determining the coordinates ($x_s$, $y_s$, $z_s$) of the transceiver node and the time $t_{ST}$ of transmission of the broadcast positioning frame by the at least one transceiver node, by numerically solving a second non-linear system of at least five equations, at least four equations of the nonlinear system using the relation $$t_m = t_{ST} + \frac{1}{c}\sqrt{(x_n - x_s)^2 + (y_n - y_s)^2 + (z_n - z_s)^2},$$

wherein
  $t_m$ is a time of reception of the broadcast positioning frame at a given anchor node n,
  $x_n$, $y_n$, $z_n$ are the coordinates of the position of anchor node n,
  $t_{ST}$, to be determined by the second solver engine, is a time of transmission of the broadcast positioning frame by the transceiver node, and
  $x_s$, $y_s$, $z_s$, to be determined by the second solver engine, are the coordinates of the transceiver node.

In another embodiment, however, the method of the first aspect does not comprise the steps 1.6 to 1.8.

In another embodiment, the method comprises
  determining a position of the at least one transceiver node with respect to a three-dimensional coordinate space, by
    the solver stage solving a non-linear system of at least five equations, wherein
      four equations of the nonlinear system are based on the relation $$t_n = t_s + \frac{1}{c}\sqrt{(x_n - x_s)^2 + (y_n - y_s)^2 + (z_n - z_s)^2} + t_{sn},$$

and
  at least one additional equation represents a known boundary condition regarding the coordinates of the transceiver node.

In a further embodiment, the method further comprises:
  determining a position of the at least one transceiver node with respect to a three-dimensional coordinate space, by:
    at least five anchor nodes performing the positioning sequence, and
    performing the solver stage, using the provided parameters, for determining the coordinates ($x_s$, $y_s$, $z_s$) of the respective transceiver node and the time $t_s$ of transmission of the first positioning frame by the anchor node of first rank in the positioning sequence by numerically solving a non-linear system of at least five equations, each equation using the relation $$t_n = t_s + \frac{1}{c}\sqrt{(x_n - x_s)^2 + (y_n - y_s)^2 + (z_n - z_s)^2} + t_{sn}.$$

In yet another embodiment of the method, the anchor nodes perform the positioning sequence as follows:
4.1 the anchor nodes of first rank transmitting a first positioning frame;
4.2 in response to receiving the first positioning frame, the anchor node of second rank
  measuring a time of reception of the first positioning frame,
  transmitting a second positioning frame, and
  ascertaining a first forwarding time span between the time of reception of the first positioning frame and the time of transmitting the second positioning frame;
4.3 in response to receiving the second positioning frame, the anchor node of third rank
  measuring a time of reception of the second positioning frame,
  transmitting a third positioning frame, and
  ascertaining a second forwarding time span between receiving the second positioning frame and transmitting the third positioning frame; and
4.4 anchor nodes of following rank in the positioning sequence continuing this positioning sequence anchor node by anchor node until a predetermined number of at least four anchor nodes have transmitted and received respective positioning frames and ascertained their respective forwarding time span.

In a further embodiment of the method, the anchor nodes follow a round-robin algorithm in scheduling the positioning sequence.

In another embodiment, the anchor node of first rank determines the start of the positioning sequence.

Another embodiment further comprises the at least one transceiver node performing the solver stage for determining its respective position.

In another embodiment of the method, at least one of the anchor nodes or a master node performs the second solver stage.

According to an independent second aspect of the present invention, a method of determining a position of at least one transceiver node with respect to an at least two-dimensional coordinate space in accordance with steps 1.1 to 1.8 is provided. The method of the second aspect of the invention thus comprises the steps of the method of the first aspect of the invention, and additionally comprises the steps 1.6 to 1.8 described in the context of an embodiment of the method of the first aspect of the invention.

In different embodiments, the method of the second aspect is implemented by using the same respective additional features as presented above for respective embodiments of the method for the first aspect.

According to a third aspect of the present invention, a transceiver node is provided which comprises:
transceiver positioning unit for determining spatial coordinates indicative of a position of the transceiver node with respect to an at least two-dimensional coordinate space, the transceiver positioning unit comprising:
 a positioning receiver configured to receive positioning frames transmitted by anchor nodes in performing a positioning sequence involving a plurality of anchor nodes and to ascertain respective times of reception for each of the received positioning frames, the positioning sequence comprising,
  anchor node by anchor node, transmitting respective positioning frames suitable for reception by the transceiver node and by at least one other of the anchor nodes, and
  a given anchor node transmitting a respective positioning frame for reception by at least that anchor node, which is the next anchor node in the positioning sequence, and by the transceiver node,
  the next anchor node in the positioning sequence receiving the positioning frame from that anchor node, which is the preceding anchor node in the positioning sequence, and ascertaining a time of reception of the positioning frame,
  the next anchor node ascertaining, after transmitting its respective positioning frame, a respective forwarding time span ($T_{Fi}$) between the time of reception of the positioning frame from the preceding anchor node and the time of transmitting the its respective positioning frame;
the transceiver positioning unit further comprising
 a solver engine for numerically solving a non-linear system of equations, the solver engine being configured to receive the following parameters:
  sets of coordinates of the known positions of the anchor nodes performing positioning sequence, the positioning sequence comprising,
  a set of times of flight ($t_{tof(i-1)i}$) between pairs of respective anchor nodes of neighboring ranks ((i−1) and i) in the positioning sequence, using their known positions and a known propagation speed of the positioning frames,
  the respective times of reception of the respective positioning frames at the respective anchor nodes performing the positioning sequence,
  the respective forwarding time spans ($T_{Fi}$) ascertained by the respective anchor nodes performing the positioning sequence, and
  the respective times of reception of the respective positioning frames from the anchor nodes at the transceiver node;
 wherein the solver engine is configured, using the provided parameters, to determine coordinates ($x_s$, $y_s$, $z_s$) of the transceiver node and the time $t_s$ of transmission of the first positioning frame by the anchor node of first rank in the positioning sequence by numerically solving a non-linear system of at least five equations, at least four equations of the nonlinear system using the relation $$t_n = t_s + \frac{1}{c}\sqrt{(x_n - x_s)^2 + (y_n - y_s)^2 + (z_n - z_s)^2} + t_{sn},$$

wherein
 $t_n$ is a time of reception of the respective positioning frame from a given anchor node of rank n in the positioning sequence at the transceiver node,
 $x_n$, $y_n$, $z_n$ are the coordinates of the position of anchor node of rank n in the positioning sequence, $$t_{sn} = \Sigma_{i=2}^{n}(t_{tof(i-1)i} + T_{Fi}),$$

$t_s$, to be determined by the solver engine, is a time of transmission of the positioning frame by the anchor node having the first rank in the positioning sequence, and
 $x_s$, $y_s$, $z_s$, to be determined by the solver engine, are the coordinates of the transceiver node.

According to fourth aspect of the present invention, an anchor node for use in determining a position of at least one external transceiver node with respect to an at least two-dimensional coordinate space is provided, The anchor node comprising:
 a positioning anchor transceiver configured to receive and transmit positioning frames in exchange with external anchor nodes in performing a positioning sequence involving a plurality of anchor nodes, the positioning sequence comprising
  anchor node by anchor node, transmitting respective positioning frames suitable for reception by the transceiver node and by at least one other of the anchor nodes, and
  a given anchor node transmitting a respective positioning frame for reception by at least that anchor node, which is the next anchor node in the positioning sequence, and by the transceiver node,
  the next anchor node in the positioning sequence receiving the positioning frame from that anchor node, which is the preceding anchor node in the positioning sequence, and ascertaining a time of reception of the positioning frame,
  the next anchor node ascertaining, after transmitting its respective positioning frame, a respective forwarding time span ($T_{Fi}$) between the time of reception of the positioning frame from the preceding anchor node and the time of transmitting the its respective positioning frame; wherein
 the positioning anchor transceiver further configured to provide to an external solver engine for numerically solving a non-linear system of equations the following parameters ascertained in performing the positioning sequence:
  the time of reception of the respective positioning frame transmitted by an external anchor node preceding in rank in the positioning sequence,
  the ascertained forwarding time span ($T_{Fi}$).

In one embodiment, the anchor node of the fourth aspect of the invention further comprises
 a second solver engine for numerically solving a non-linear system of equations, the second solver engine being configured to receive the following parameters:

the determined time $t_s$ of transmission of the first positioning frame by the anchor node of first rank in the positioning sequence;

the sets of coordinates of the known positions of the external anchor nodes performing the positioning sequence, the respective times of reception of the broadcast positioning frame at the respective other external anchor nodes; wherein the second solver engine is configured, using the provided parameters, to determine the coordinates $(x_s, y_s, z_s)$ of the transceiver node and the time $t_{ST}$ of transmission of the broadcast positioning frame by the at least one transceiver node, by numerically solving a second non-linear system of at least five equations for 3D localization, or at least four equations for 2D localization, of the nonlinear system using the relation $$t_m = t_{ST} + \frac{1}{c}\sqrt{(x_n - x_s)^2 + (y_n - y_s)^2 + (z_n - z_s)^2},$$

wherein
$t_m$ is a time of reception of the broadcast positioning frame at a given anchor node n,
$x_n, y_n, z_n$ are the coordinates of the position of anchor node n,
$t_{ST}$, to be determined by the second solver engine, is a time of transmission of the broadcast positioning frame by the transceiver node, and
$x_s, y_s, z_s$, to be determined by the second solver engine, are the coordinates of the transceiver node.

In another embodiment, the anchor node of the fourth aspect of the invention does not comprise the features of the embodiment just described.

An independent fifth aspect of the present invention is an anchor node for use in determining a position of at least one external transceiver node with respect to an at least two-dimensional coordinate space, the anchor node comprising:

a positioning anchor transceiver configured to receive and transmit positioning frames in exchange with external anchor nodes in performing a positioning sequence involving a plurality of anchor nodes, the positioning sequence comprising anchor node by anchor node, transmitting respective positioning frames suitable for reception by the transceiver node and by at least one other of the anchor nodes, and a given anchor node transmitting a respective positioning frame for reception by at least that anchor node, which is the next anchor node in the positioning sequence, and by the transceiver node, the next anchor node in the positioning sequence receiving the positioning frame from that anchor node, which is the preceding anchor node in the positioning sequence, and ascertaining a time of reception of the positioning frame, the next anchor node ascertaining, after transmitting its respective positioning frame, a respective forwarding time span $(T_{Fi})$ between the time of reception of the positioning frame from the preceding anchor node and the time of transmitting the its respective positioning frame; wherein the positioning anchor transceiver further configured to provide to an external solver engine for numerically solving a non-linear system of equations the following parameters ascertained in performing the positioning sequence:

the time of reception of the respective positioning frame transmitted by an external anchor node preceding in rank in the positioning sequence, the ascertained forwarding time span $(T_{Fi})$;

wherein the anchor node further comprises a second solver engine for numerically solving a non-linear system of equations, the second solver engine being configured to receive the following parameters:

the determined time $t_s$ of transmission of the first positioning frame by the anchor node of first rank in the positioning sequence;

the sets of coordinates of the known positions of the external anchor nodes performing the positioning sequence, the respective times of reception of the broadcast positioning frame at the respective other external anchor nodes; wherein the second solver engine is configured, using the provided parameters, to determine the coordinates $(x_s, y_s, z_s)$ of the transceiver node and the time $t_{ST}$ of transmission of the broadcast positioning frame by the at least one transceiver node, by numerically solving a second non-linear system of at least five equations for 3D localization, or at least four equations for 2D localization, of the nonlinear system using the relation $$t_m = t_{ST} + \frac{1}{c}\sqrt{(x_n - x_s)^2 + (y_n - y_s)^2 + (z_n - z_s)^2},$$

wherein
$t_m$ is a time of reception of the broadcast positioning frame at a given anchor node n,
$x_n, y_n, z_n$ are the coordinates of the position of anchor node n,
$t_{ST}$, to be determined by the second solver engine, is a time of transmission of the broadcast positioning frame by the transceiver node, and
$x_s, y_s, z_s$, to be determined by the second solver engine, are the coordinates of the transceiver node.

A sixth aspect of the present invention is a positioning arrangement for determining a position of at least one transceiver node with respect to an at least two-dimensional coordinate space, the arrangement comprising at least four anchor nodes, wherein at least four anchor nodes are configured to jointly perform a positioning sequence comprising a given anchor node transmitting a respective positioning frame for reception by at least that anchor node, which is the next anchor node in the positioning sequence, and by the at least one transceiver node, the next anchor node in the positioning sequence receiving the positioning frame from that anchor node, which is the preceding anchor node in the positioning sequence, and ascertaining a time of reception of the positioning frame, the next anchor node ascertaining, after transmitting its respective positioning frame, a respective forwarding time span $(T_{Fi})$ between the time of reception of the positioning frame from the preceding anchor node and the time of transmitting the its respective positioning frame.

In one embodiment of this positioning arrangement, the anchor nodes are in accordance with the fourth or fifth aspect of the present invention.

Another embodiment of the positioning arrangement further comprises at least one transceiver node according to the third aspect of the invention or one of its embodiments, wherein the positioning arrangement is configured to perform method of the first or second aspect of the invention.

BRIEF DESCRIPTION OF THE DRAWINGS

In the following, the method of the invention, its advantages, and advantageous embodiments will be explained, occasionally making additional reference to the enclosed drawings, wherein.

DETAILED DESCRIPTION

The methods of the first and second aspect of the invention allow for localization of transceiver nodes such as mobile stations (STA). The methods are particularly advantageous for applications using a wireless communication channel for providing the positioning frames, such as in a wireless network. The at least one transceiver node receives the positioning frames from anchor nodes. The positioning frames can be simple, in some embodiments merely providing signals allowing the determination of a time of reception (arrival), if the positioning sequence performed by the anchor nodes is known to all nodes involved in performing the method. The anchor nodes may also be called access points (AP) with the same meaning. The methods allow estimating an unknown position of the transceiver node, using the Time of Arrival (ToA) approach. It is a particular advantage of the method that the anchor nodes do not have to be synchronized.

The infrastructure to be provided for performing the method includes a plurality of anchor nodes (access points) APn of known position.

The anchor nodes are in some embodiments additionally used for performing or relaying data communication with the transceiver nodes. Furthermore, the anchor nodes can receive the frames sent from the other anchor nodes from a wireless network.

Figure 1:
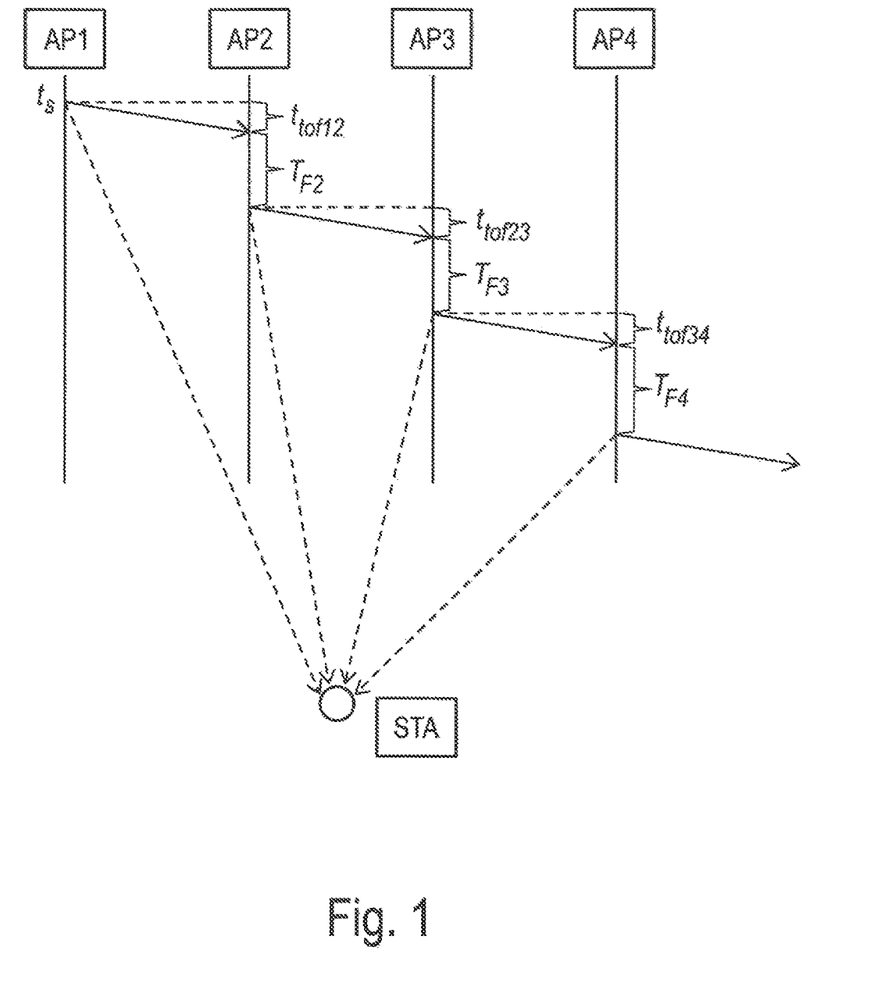
FIG. 1 is an illustration of a positioning method according to a first embodiment of the present invention.

In order to generate the frames needed for positioning, the anchor nodes perform a positioning sequence, involving a sequential transmission of positioning frames, anchor node by anchor node. The associated scheduling of transmissions is in some embodiments performed in a Round Robin fashion. A first anchor node (AP1), in other words, the anchor node of first rank in the positioning sequence, can be referred to as the master node and is used to start the positioning frame transmission. The first anchor node transmits a positioning frame, which is received by the at least one transceiver node as well as the other anchor nodes, at least, however by a second anchor node, which is the anchor node of second rank in the positioning sequence. The order of ranks in the positioning sequence is suitably predetermined in some way, which implies that case that, in absence of a prior determination, it can be determined instantly by the anchor nodes involved in performing the method in accordance with predetermined ranking criteria. The second anchor node which transmits a second positioning frame is also referred to in brief as AP2. This anchor node AP2 measures precisely a time span between the time of reception of the positioning frame from AP1 and the time of transmission of the next (second) positioning frame from this anchor node, i.e., AP2. This time span is herein called the forwarding time $T_{Fn}$ of node APn. The second positioning frame is also received by the other anchor nodes, at least by a predetermined AP3, and by the transceiver node(s). This next anchor node AP3 transmits a third positioning frame after the second positioning frame from AP2 has been received. In the same way as AP2, AP3 measures the associated forwarding time $T_{F3}$, which is the time span from reception of the second positioning frame from AP2 to transmission of a third positioning frame from AP3 itself. The same procedure is repeated by AP4, AP5 and the rest of the anchor nodes which may be included in this positioning sequence.

The transceiver node, also referred to as the station (STA), receives the transmissions of respective positioning frames from all the anchor nodes sending. If the first station transmitted at time $t_S$, the frame from AP1 would arrive at STA at time $t_1 = t_S + t_{tof1}$. The time $t_{tof1}$ is the time of flight needed for the frame to travel from AP1 to STA. The frame from AP2 would arrive at time $t_2 = t_s + t_{tof12} + T_{F2} \pm t_{tof2}$. The time $t_{tof12}$ is the time of flight between the AP1 and AP2. The time $T_{F2}$ is the forwarding time of AP2. The time $t_{tof2}$ is the time of flight between AP2 and STA. Generally, the frame from APn would arrive at the STA at a time $$t_n = t_s + t_{tofn} + \Sigma_{i=2}^{n}(t_{tof(i-1)i} + T_{Fi}) \qquad (1)$$

where n is the number of anchor node APn.

The term $$t_{sn} = \Sigma_{i=2}^{n}(t_{tof(i-1)i} + T_{Fi}) \qquad (2)$$

in the above equation (1) is known, and also $t_n$, which has been measured by the transceiver node. The times of flight ($t_{tof(i-1)i}$) between pairs of respective anchor nodes of neighboring ranks ((i−1) and i) in the positioning sequence can be determined using their known positions and the known propagation speed of the positioning frames. The forwarding times $T_{Fi}$ are also known, since they are measured by the anchor nodes.

Unknown parameters in equation (1) are thus the time $t_s$ of transmission of the first positioning frame by AP1 and the time of flight $t_{tofn}$ from the anchor node n to the transceiver node. This time of flight $t_{tofn}$ can be expressed as $$t_{tofn} = \frac{1}{c}\sqrt{(x_n - x_s)^2 + (y_n - y_s)^2 + (z_n - z_s)^2}, \qquad (3)$$

where c is the constant propagation speed of the positioning frame, $x_n$, $y_n$, $z_n$ are the known coordinates of the position of anchor node of rank n in the positioning sequence, and $x_s$, $y_s$, $z_s$ are the coordinates of the transceiver node. In wireless networks using electromagnetic radiation signals for transmission of the positioning frames, c is equal to the speed of light.

By substituting the (2) and (3) into (1), we get $$t_n = t_s + \frac{1}{c}\sqrt{(x_n - x_s)^2 + (y_n - y_s)^2 + (z_n - z_s)^2} + t_{sn}. \qquad (4)$$

In equation (4) there are four unknown quantities. These are: $t_s$, which is the point in time when the transmission form the first anchor node AP1 was started, and the position of the transceiver node, described with the coordinates $x_s$, $y_s$ and $z_s$.

In order to allow a calculation the transceiver node position, the transceiver node measures the time of arrival $t_n$, for each positioning received frame from the anchor nodes during the positioning sequence.

In an exemplary positioning arrangement having four anchor nodes, four equations can thus be constructed from equation (4), and a system of equations can be formed. This system is nonlinear. Methods for solving such systems of equations are well known and will be described in more detail further below.

Since the system of equations specified with equation (4) is nonlinear, i.e. quadratic, one more equation is required in order to estimate a position in three dimensional space. That additional equation can be provided in one embodiment by a positioning arrangement having at least 5 anchor nodes.

In one embodiment determining a position of the at least one transceiver node with respect to a three-dimensional coordinate space comprises:
  at least five anchor nodes performing the positioning sequence, and
  performing the solver stage, using the provided parameters, for determining the coordinates ($x_s$, $y_s$, $z_s$) of the respective transceiver node and the time $t_s$ of transmission of the first positioning frame by the anchor node of first rank in the positioning sequence by numerically solving a non-linear system of at least five equations, each equation using the relation (4) mentioned above.

In an alternative embodiment, determining a position of the at least one transceiver node with respect to a three-dimensional coordinate space comprises
  the solver stage solving a non-linear system of at least five equations, wherein
    four equations of the nonlinear system are based on the relation (4), and
    at least one additional equation represents a known boundary condition regarding the coordinates of the transceiver node.

With a system of four equations, i.e. four anchor nodes, the Z coordinate $z_s$ of the station would be calculated as a square root of some previously calculated value. Therefore, both the positive and negative value of Z would equally satisfy the equation, resulting in an ambiguity of the exact value of $z_s$. Introducing an additional known constraint in the present embodiment, for instance of the type that $z_s$ can only be either positive or negative, one anchor node can be eliminated from the positioning arrangement. Thus, three-dimensional positioning can be performed with four anchor nodes under these conditions.

In an embodiment used for two-dimensional positioning, four anchor nodes are enough to obtain the position of the station. Again, additional constraints can lead to a reduction of the minimum number of required anchor nodes to three.

In one group of embodiments, the at least one transceiver node performs the solver stage for determining its respective position. The forwarding times of each anchor node should thus be transmitted to the transceiver node. If the forwarding times are constant and fixed for all anchor nodes, only one value has to be supplied to the transceiver node only once. If the forwarding times vary, they have to be updated regularly, for each position estimation. The absolute or relative positions of the anchor nodes should also be either known or provided to the transceiver nodes. If these positions are constant and fixed they are preferably supplied to the mobile stations only once.

In some of these embodiments involving an estimation of the transceiver node position at the transceiver node itself using the received positioning frames from the anchor nodes, the transceiver node is passive. In other words, no transmissions are performed from the transceiver node in the context of positioning. In such embodiments, the number of transceiver nodes, which can use the transmitted signals for position estimation, is practically unlimited. The transceiver node can even be implemented as a receiver node in such embodiments for the purpose of performing the method of the present invention. However, depending on an application case, the transceiver may advantageously be suitable for transmission in other functional contexts not related to positioning.

If a transceiver node receives signals from more than 4 (or 5 for 3D) anchor nodes an overdetermined system of equations would result. Solving such an overdetermined system of equations can be performed using a least-squares approach. By using all of the equations, with the least-squares approach, the precision of the positioning can even be improved. An alternative variant uses only those four (five in 3D) positioning frames received with the strongest signals. Another preferred approach to this situation is to use a method of weighted least-squares, where the strongest signals have more influence on the position estimation.

In different embodiments, the sub-process of the method representing the solver stage is performed using different methods for numerically solving a set of nonlinear equations. One method which per se is well known is an iterative Newton's method. It is an iterative technique, based on linearization, usually with Taylor series.

The methods for solving the non-linear system of equations are less computationally intensive, compared to the Time of Arrival estimation, which is preferably performed before position estimation. Therefore, estimation of Time of Arrival is the main concern regarding the computational complexity of the given approach. Implementing this method can be achieved using and ASIC, FPGA or even in software.

Alternative methods for solving nonlinear equations, that are used in GPS, and can be exploited to further reduce the hardware requirements. Suitable alternative methods are for example described in:
[1] Leva, J., "An Alternative Closed Form Solution to the GPS Pseudorange Equations," Proc. of The Institute of Navigation (ION) National Technical Meeting, Anaheim, Calif., January 1995,
[2] Bancroft, S., "An Algebraic Solution of the GPS Equations," IEEE Trans. on Aerospace and Electronic Systems, Vol. AES-21, No. 7, January 1985, pp. 56-59, and
[3] Chaffee, J. W., and J. S. Abel, "Bifurcation of Pseudorange Equations," Proc. of The Institute of Navigation National Technical Meeting, San Francisco, Calif., January 1993, pp. 203-211.

Figure 2:
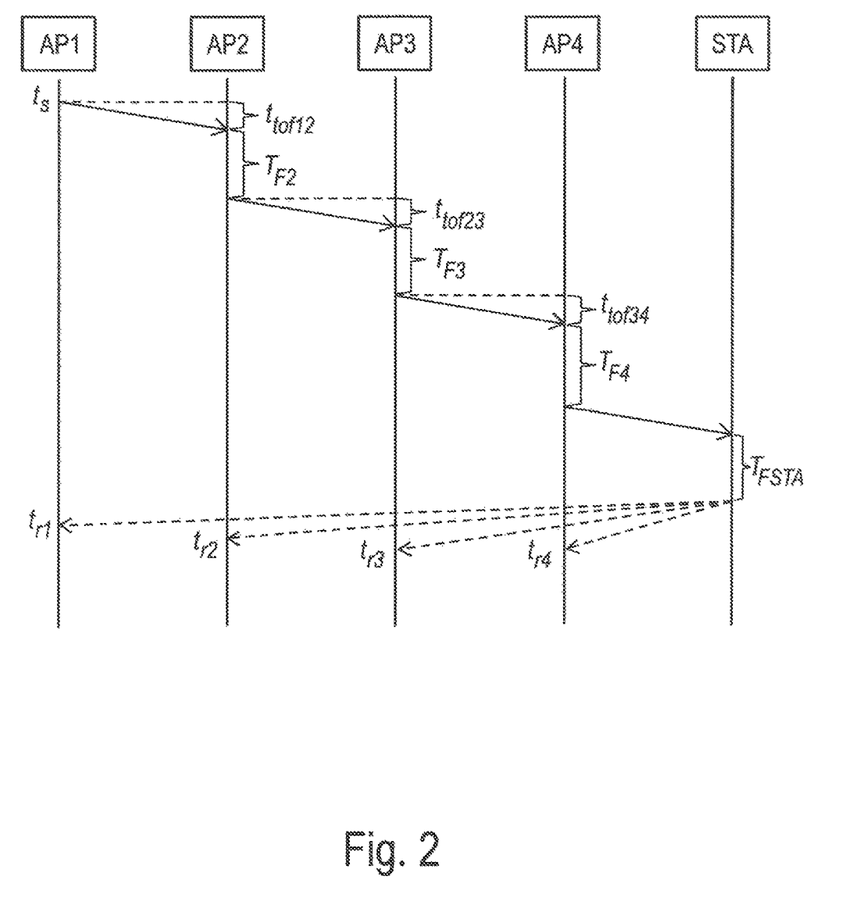
FIG. 2 is an illustration of a positioning method according to a second embodiment of the present invention.

In case an infrastructure formed by the anchor nodes (APn) shall be empowered to additionally or alternatively estimate the position of the transceiver node, the method is extended by
  performing a positioning extension sequence including:
    providing the determined time $t_s$ of transmission of the first positioning frame by the anchor node of first rank in the positioning sequence to the anchor nodes involved in the positioning sequence;
    after the positioning sequence has been performed by the anchor nodes, the at least one transceiver node broadcasting a broadcast positioning frame for reception by all anchor nodes;

the anchor nodes receiving the broadcast positioning frame from the transceiver node and ascertaining a respective time of its reception, using the time $t_s$ of transmission of the first positioning frame by the anchor node of first rank in the positioning sequence as a common reference point in time;

providing to a second solver stage for numerically solving a non-linear system of equations the following parameters:

the sets of coordinates of the known positions of the anchor nodes performing the positioning sequence, the respective times of reception of the broadcast positioning frame at the respective anchor nodes, performing a second solver stage using the provided parameters, for determining the coordinates $(x_s, y_s, z_s)$ of the transceiver node and the time $t_{ST}$ of transmission of the broadcast positioning frame by at least one transceiver node, by numerically solving a second non-linear system of at least four equations of the nonlinear system using the relation $$t_{rn} = t_{ST} + \frac{1}{c}\sqrt{(x_n - x_s)^2 + (y_n - y_s)^2 + (z_n - z_s)^2}, \quad (5)$$

wherein $t_{rn}$ is a time of reception of the broadcast positioning frame at a given anchor node n, $x_n, y_n, z_n$ are the coordinates of the position of anchor node n, $t_{ST}$, to be determined by the second solver engine, is a time of transmission of the broadcast positioning frame by the transceiver node, and $x_s, y_s, z_s$, to be determined by the second solver engine, are the coordinates of the transceiver node.

Thus, the transceiver node should transmit a broadcast positioning frame, after the anchor nodes have finished transmitting in the positioning sequence described above. If the positions of multiple transceiver nodes (STA) are to be estimated, those stations, for which the infrastructure should estimate their positions, have to transmit, e.g. in a round robin fashion, a broadcast positioning frame each.

The broadcast positioning frame transmitted from the STA, arrives at the anchor nodes (APn). The times of arrival at the respective anchor nodes are $t_{r1}, t_{r2}, t_{r3}, \ldots t_{rn}$.

The time of arrival can be calculated as $$t_{rn} = t_{ST} + t_{tofn} \quad (6)$$

where $t_{rn}$ is the time of arrival of the frame at the anchor node n (APn), $t_{ST}$ is the time when the frame was sent and the $t_{tofn}$ is the time of flight between the STA and the anchor node n (APn).

The time of flight between the STA and the APn can be calculated as $$t_{tofn} = \frac{1}{c}\sqrt{(x_n - x_s)^2 + (y_n - y_s)^2 + (z_n - z_s)^2} \quad (7)$$

By substituting (7) in (6), equation (5) is obtained:

Having n anchor nodes, and n times of arrival $t_{rn}$, a system of n equations can be constructed. There are 4 unknowns, $t_{ST}, x_s, y_s$ and $z_s$. The $t_{rn}$, and the coordinates of the anchor nodes $x_n, y_n$ and $z_n$, are known. The system of equations is not linear. Therefore, for solving it for a three dimensional case, five equations are needed, therefore, five anchor nodes.

Additional constraints can usually be introduced in order to reduce the number of equations and anchor nodes to four (e.g. Z can only be positive). For the two-dimensional case, four anchor nodes are needed and, therefore, four equations in the system. Additional constraints can be used in order to reduce the number of anchor nodes to three.

The anchor nodes can thus estimate the time is when the first anchor node AP1 transmitted the first positioning frame. As a result, the method of the present embodiment achieves that the times of arrival of the positioning frame transmitted from the STA can be measured by the anchor nodes using the same time reference. The anchor nodes are in this sense quasi synchronized.

In order to avoid a time reference drift in each APn due to clock offset, the transmissions of the positioning sequence between the APns should be performed shortly before each localization of STAs.

Preferably, the anchor nodes exchange information on the arrival time in order to estimate the position of the transceiver node. This can be performed by e.g. sending all measured arrival times and forwarding times to a master node (AP-M). Thus, in different embodiments, at least one of the anchor nodes or the master node receiving all required information performs the second solver stage.

It is noted that the positioning using the second solver stage need not be performed for all transceiver nodes. Some transceiver nodes can perform positioning from the received signals as described before, and the others can transmit frames, in order for the infrastructure to perform the positioning.

It is noted that the applicability of the method does not only extend to wireless communication, including electromagnetic signals, such as radio frequency, GHz, infrared or visible electromagnetic signals. However, it is not limited to using electromagnetic waves for the estimation of the time-of-flight and distance. The same principles can be applied to transmissions acoustic waves in different media (e.g. air or water). For the calculation of the actual distances the speed of propagation in the media used has to be applied.

Visibility in terms of communication is required only between successive anchor nodes in the positioning sequence. Complete connectivity between the anchor nodes is not required. It is also not required that all anchor nodes can be reached by a single master node.

The positioning frames (messages) preferably have a data field and a special signal sequence used for time of arrival estimation. In the data field, the address of the next anchor node in the positioning sequence can be inserted, besides other data. The anchor node that recognizes this address is to transmit its positioning frame next.

Embodiments of a transceiver node comprise
 a transceiver positioning unit for determining spatial coordinates indicative of a position of the transceiver node with respect to an at least two-dimensional coordinate space, the transceiver positioning unit comprising:
 a positioning receiver configured to receive positioning frames transmitted by anchor nodes in performing a positioning sequence involving a plurality of anchor nodes and to ascertain respective times of reception for each of the received positioning frames, the positioning sequence comprising,
  anchor node by anchor node, transmitting respective positioning frames suitable for reception by the transceiver node and by at least one other of the anchor nodes, and a given anchor node transmitting a respective positioning frame for reception by at least that anchor node, which is the next anchor node in the positioning sequence, and by the transceiver node,
the next anchor node in the positioning sequence receiving the positioning frame from that anchor node, which is the preceding anchor node in the positioning sequence, and ascertaining a time of reception of the positioning frame,
the next anchor node ascertaining, after transmitting its respective positioning frame, a respective forwarding time span ($T_{Fi}$) between the time of reception of the positioning frame from the preceding anchor node and the time of transmitting the its respective positioning frame;
the transceiver positioning unit further comprising
a solver engine for numerically solving a non-linear system of equations, the solver engine being configured to receive the following parameters:
sets of coordinates of the known positions of the anchor nodes performing positioning sequence, the positioning sequence comprising,
a set of times of flight ($t_{tof(i-1)i}$) between pairs of respective anchor nodes of neighboring ranks ((i−1) and i) in the positioning sequence, using their known positions and a known propagation speed of the positioning frames,
the respective times of reception of the respective positioning frames at the respective anchor nodes performing the positioning sequence,
the respective forwarding time spans ($T_{Fi}$) ascertained by the respective anchor nodes performing the positioning sequence, and
the respective times of reception of the respective positioning frames from the anchor nodes at the transceiver node;
wherein the solver engine is configured, using the provided parameters, to determine coordinates ($x_s$, $y_s$, $z_s$) of the transceiver node and the time $t_s$ of transmission of the first positioning frame by the anchor node of first rank in the positioning sequence by numerically solving a non-linear system of at least five equations, at least four equations of the nonlinear system using the relation $$t_n = t_s + \frac{1}{c}\sqrt{(x_n - x_s)^2 + (y_n - y_s)^2 + (z_n - z_s)^2} + t_{sn},$$

wherein
$t_n$ is a time of reception of the respective positioning frame from a given anchor node of rank n in the positioning sequence at the transceiver node,
$x_n$, $y_n$, $z_n$ are the coordinates of the position of anchor node of rank n in the positioning sequence, $$t_{sn} = \Sigma_{i=2}^{n}(t_{tof(i-1)i} + T_{Fi}),$$

$t_s$, to be determined by the solver engine, is a time of transmission of the positioning frame by the anchor node having the first rank in the positioning sequence, and
$x_s$, $y_s$, $z_s$, to be determined by the solver engine, are the coordinates of the transceiver node.
The transceiver node shares the advantages of the method of the first aspect of the invention. The transceiver node can be a mobile device, without intending to constrain the applicability of the present invention. It can also be applied to determine the position of transceiver nodes forming fixed stations.

Embodiments of an anchor node for use in determining a position of at least one external transceiver node with respect to an at least two-dimensional coordinate space comprise:
a positioning anchor transceiver configured to receive and transmit positioning frames in exchange with external anchor nodes in performing a positioning sequence involving a plurality of anchor nodes, the positioning sequence comprising
anchor node by anchor node, transmitting respective positioning frames suitable for reception by the transceiver node and by at least one other of the anchor nodes, and
a given anchor node transmitting a respective positioning frame for reception by at least that anchor node, which is the next anchor node in the positioning sequence, and by the transceiver node,
the next anchor node in the positioning sequence receiving the positioning frame from that anchor node, which is the preceding anchor node in the positioning sequence, and ascertaining a time of reception of the positioning frame,
the next anchor node ascertaining, after transmitting its respective positioning frame, a respective forwarding time span ($T_{Fi}$) between the time of reception of the positioning frame from the preceding anchor node and the time of transmitting the its respective positioning frame; wherein
the positioning anchor transceiver further configured to provide to an external solver engine for numerically solving a non-linear system of equations the following parameters ascertained in performing the positioning sequence:
the time of reception of the respective positioning frame transmitted by an external anchor node preceding in rank in the positioning sequence,
the ascertained forwarding time span ($T_{Fi}$).
The anchor node is suitable for performing the method of the first aspect of the invention. It thus shares its advantages.
Embodiments of the anchor node are configured to perform embodiments of the method of the first aspect of the invention.
In one embodiment, the further anchor node further comprises
a second solver engine for numerically solving a non-linear system of equations, the second solver engine being configured to receive the following parameters:
the determined time $t_s$ of transmission of the first positioning frame by the anchor node of first rank in the positioning sequence;
the sets of coordinates of the known positions of the external anchor nodes performing the positioning sequence,
the respective times of reception of the broadcast positioning frame at the respective other external anchor nodes; wherein
the second solver engine is configured, using the provided parameters, to determine the coordinates ($x_s$, $y_s$, $z_s$) of the transceiver node and the time $t_{ST}$ of transmission of the broadcast positioning frame by the at least one transceiver node, by numerically solving a second non-linear system of at least five equations, at least four equations of the nonlinear system using the relation $$t_m = t_{ST} + \frac{1}{c}\sqrt{(x_n - x_s)^2 + (y_n - y_s)^2 + (z_n - z_s)^2},$$

wherein $t_{rn}$ is a time of reception of the broadcast positioning frame at a given anchor node n, $x_n$, $y_n$, $z_n$ are the coordinates of the position of anchor node n, $t_{ST}$, to be determined by the second solver engine, is a time of transmission of the broadcast positioning frame by the transceiver node, and $x_s$, $y_s$, $z_s$ to be determined by the second solver engine, are the coordinates of the transceiver node.

A positioning arrangement for determining a position of at least one transceiver node with respect to an at least two-dimensional coordinate space, the arrangement comprising at least three anchor nodes, wherein the at least three anchor nodes are configured to jointly perform a positioning sequence comprises a given anchor node transmitting a respective positioning frame for reception by at least that anchor node, which is the next anchor node in the positioning sequence, and by the at least one transceiver node, the next anchor node in the positioning sequence receiving the positioning frame from that anchor node, which is the preceding anchor node in the positioning sequence, and ascertaining a time of reception of the positioning frame, the next anchor node ascertaining, after transmitting its respective positioning frame, a respective forwarding time span ($T_{Fi}$) between the time of reception of the positioning frame from the preceding anchor node and the time of transmitting the its respective positioning frame.

The positioning arrangement achieves positioning in accordance with the first aspect. The positioning arrangement of one embodiment has anchor nodes that are in accordance with the fourth of fifth aspect of the invention or one of its embodiments.

Preferred embodiments of the positioning arrangement further comprise at least one transceiver node according to the third aspect of the invention or one of its embodiments.

In summary, a method of determining a position of at least one transceiver node comprises, anchor node by anchor node, transmitting respective positioning frames suitable for reception by a transceiver node and by the other anchor nodes. The transceiver node receives the positioning frames transmitted by the anchor nodes and ascertains respective times of reception for each. A solver stage determines the coordinates ($x_s$, $y_s$, $z_s$) of the respective transceiver node and the time $t_s$ of transmission of the first positioning frame by an anchor node of first rank in the positioning sequence by numerically solving a non-linear system of at least five equations.

ACKNOWLEDGEMENT

The project contributing to this application has received funding from the European Union's Horizon 2020 research and innovation programme under grant agreement No 671551.

What is claimed is:

1. A method of determining a position of at least one transceiver node with respect to an at least two-dimensional coordinate space, the method comprising:

providing, at respective known spatial positions, at least four anchor nodes;

in performing a positioning sequence, anchor node by anchor node transmitting respective positioning frames suitable for reception by the at least one transceiver node and by at least one other of the anchor nodes, wherein the positioning sequence comprises a given anchor node transmitting a respective positioning frame for reception by at least that anchor node, which is the next anchor node in the positioning sequence, and by the at least one transceiver node, the next anchor node in the positioning sequence receiving the positioning frame from that anchor node, which is the preceding anchor node in the positioning sequence, and ascertaining a time of reception of the positioning frame, and the next anchor node ascertaining, after transmitting its respective positioning frame, a respective forwarding time span ($T_{Fi}$) between the time of reception of the positioning frame from the preceding anchor node and the time of transmitting the its respective positioning frame;

the at least one transceiver node receiving the positioning frames transmitted by the anchor nodes and ascertaining respective times of reception for each of the received positioning frames;

providing to a solver stage for numerically solving a non-linear system of equations the following parameters:

sets of coordinates of the known positions of the anchor nodes performing the positioning sequence, a set of times of flight ($t_{tof(i-1)i}$) between pairs of respective anchor nodes of neighboring ranks ((i−1) and i) in the positioning sequence, using their known positions and a known propagation speed of the positioning frames, the respective times of reception of the respective positioning frames at the respective anchor nodes performing the positioning sequence, the respective forwarding time spans (TFi) ascertained by the respective anchor nodes performing the positioning sequence, and the respective times of reception of the respective positioning frames from the anchor nodes at the at least one transceiver node;

performing the solver stage, using the provided parameters, for determining the coordinates ($x_s$, $y_s$, $z_s$) of the respective transceiver node and the time $t_s$ of transmission of the first positioning frame by the anchor node of first rank in the positioning sequence by numerically solving a non-linear system of at least five equations, at least four equations of the nonlinear system using the relation $$t_n = t_s + \frac{1}{c}\sqrt{(x_n - x_s)^2 + (y_n - y_s)^2 + (z_n - z_s)^2} + t_{sn},$$

wherein $t_n$ is a time of reception of the respective positioning frame from a given anchor node of rank n in the positioning sequence at the at least one transceiver node, $x_n$, $y_n$, $z_n$ are the coordinates of the position of anchor node of rank n in the positioning sequence, $$t_{sn} = \Sigma_{i=2}^{n}(t_{tof(i-1)i} + T_{Fi}),$$

$t_s$, to be determined by the solver engine, is a time of transmission of the positioning frame by the anchor node having the first rank in the positioning sequence, and $x_s$, $y_s$, zs, to be determined by the solver engine, are the coordinates of the transceiver node;

performing a positioning extension sequence including:
providing the determined time $t_s$ of transmission of the first positioning frame by the anchor node of first rank in the positioning sequence to the anchor nodes involved in the positioning sequence;

after the positioning sequence has been performed by the anchor nodes, the at least one transceiver node broadcasting a broadcast positioning frame for reception by all anchor nodes;

the anchor nodes receiving the broadcast positioning frame from the transceiver node and ascertaining a respective time of its reception, using the time $t_s$ of transmission of the first positioning frame by the anchor node of first rank in the positioning sequence as a common reference point in time;

providing to a second solver stage for numerically solving a non-linear system of equations using the following parameters:

the sets of coordinates of the known positions of the anchor nodes performing the positioning sequence,
the respective times of reception of the broadcast positioning frame at the respective anchor nodes, and performing a second solver stage using the provided parameters, for determining the coordinates ($x_s$, $y_s$, $z_s$) of the transceiver node and the time $t_{ST}$ of transmission of the broadcast positioning frame by the at least one transceiver node, by numerically solving a second non-linear system of at least five equations, at least four equations of the nonlinear system using the relation $$t_m = t_{ST} + \frac{1}{c}\sqrt{(x_n - x_s)^2 + (y_n - y_s)^2 + (z_n - z_s)^2},$$

wherein
$t_m$ is a time of reception of the broadcast positioning frame at a given anchor node n,
$x_n$, $y_n$, $z_n$ are the coordinates of the position of anchor node n,
$t_{ST}$, to be determined by the second solver engine, is a time of transmission of the broadcast positioning frame by the transceiver node, and
$x_s$, $y_s$, $z_s$, to be determined by the second solver engine, are the coordinates of the transceiver node.

2. The method of claim 1, comprising
determining a position of the at least one transceiver node with respect to a three-dimensional coordinate space, by
the solver stage solving a non-linear system of at least five equations, wherein
four equations of the nonlinear system are based on the relation $$t_n = t_s + \frac{1}{c}\sqrt{(x_n - x_s)^2 + (y_n - y_s)^2 + (z_n - z_s)^2} + t_{sn},$$

and
at least one additional equation represents a known boundary condition regarding the coordinates of the transceiver node.

3. The method of claim 1, comprising:
determining a position of the at least one transceiver node with respect to a three-dimensional coordinate space, by:
at least five anchor nodes performing the positioning sequence, and
performing the solver stage, using the provided parameters, for determining the coordinates ($x_s$, $y_s$, $z_s$) of the respective transceiver node and the time is of transmission of the first positioning frame by the anchor node of first rank in the positioning sequence by numerically solving a non-linear system of at least five equations, each equation using the relation $$t_n = t_s + \frac{1}{c}\sqrt{(x_n - x_s)^2 + (y_n - y_s)^2 + (z_n - z_s)^2} + t_{sn}.$$

4. The method of claim 1, wherein the anchor nodes perform the positioning sequence as follows:
the anchor nodes of first rank transmitting a first positioning frame;
in response to receiving the first positioning frame, the anchor node of second rank
measuring a time of reception of the first positioning frame,
transmitting a second positioning frame, and
ascertaining a first forwarding time span between the time of reception of the first positioning frame and the time of transmitting the second positioning frame;
in response to receiving the second positioning frame, the anchor node of third rank
measuring a time of reception of the second positioning frame,
transmitting a third positioning frame, and
ascertaining a second forwarding time span between receiving the second positioning frame and transmitting the third positioning frame; and
anchor nodes of following rank in the positioning sequence continuing this positioning sequence anchor node by anchor node until a predetermined number of at least four anchor nodes have transmitted and received respective positioning frames and ascertained their respective forwarding time span.

5. The method of claim 1, wherein the anchor nodes follow a round-robin algorithm in scheduling the positioning sequence.

6. The method of claim 1, wherein the anchor node of first rank determines the start of the positioning sequence.

7. The method of claim 1, further comprising:
the at least one transceiver node performing the solver stage for determining its respective position.

8. The method of claim 1, wherein at least one of the anchor nodes or a master node performs the second solver stage.

9. A transceiver node comprising
a transceiver positioning unit for determining spatial coordinates indicative of a position of the transceiver node with respect to an at least two-dimensional coordinate space, the transceiver positioning unit comprising:
a positioning receiver configured to receive positioning frames transmitted by anchor nodes in performing a positioning sequence involving a plurality of anchor nodes and to ascertain respective times of reception for each of the received positioning frames, the positioning sequence comprising, anchor node by anchor node, transmitting respective positioning frames suitable for reception by the transceiver node and by at least one other of the anchor nodes, and a given anchor node transmitting a respective positioning frame for reception by at least that anchor node, which is the next anchor node in the positioning sequence, and by the transceiver node, the next anchor node in the positioning sequence receiving the positioning frame from that anchor node, which is the preceding anchor node in the positioning sequence, and ascertaining a time of reception of the positioning frame, the next anchor node ascertaining, after transmitting its respective positioning frame, a respective forwarding time span (TFi) between the time of reception of the positioning frame from the preceding anchor node and the time of transmitting the its respective positioning frame;

the transceiver positioning unit further comprising a solver engine for numerically solving a non-linear system of equations, the solver engine being configured to receive the following parameters:

sets of coordinates of the known positions of the anchor nodes performing positioning sequence, the positioning sequence comprising, a set of times of flight ($t_{tof(i-1)i}$) between pairs of respective anchor nodes of neighboring ranks ((i−1) and i) in the positioning sequence, using their known positions and a known propagation speed of the positioning frames, the respective times of reception of the respective positioning frames at the respective anchor nodes performing the positioning sequence, the respective forwarding time spans ($T_{Fi}$) ascertained by the respective anchor nodes performing the positioning sequence, and the respective times of reception of the respective positioning frames from the anchor nodes at the transceiver node;

wherein the solver engine is configured, using the provided parameters, to determine coordinates ($x_s$, $y_s$, $z_s$) of the transceiver node and the time is of transmission of the first positioning frame by the anchor node of first rank in the positioning sequence by numerically solving a non-linear system of at least five equations, at least four equations of the nonlinear system using the relation $$t_n = t_s + \frac{1}{c}\sqrt{(x_n - x_s)^2 + (y_n - y_s)^2 + (z_n - z_s)^2} + t_{sn},$$

wherein $t_n$ is a time of reception of the respective positioning frame from a given anchor node of rank n in the positioning sequence at the transceiver node, $x_n$, $y_n$, $z_n$ are the coordinates of the position of anchor node of rank n in the positioning sequence, $t_{sn} = \Sigma_{i=2}^{n}(t_{tof(i-1)i} + T_{Fi})$, $t_s$, to be determined by the solver engine, is a time of transmission of the positioning frame by the anchor node having the first rank in the positioning sequence, and $x_s$, $y_s$, $z_s$, to be determined by the solver engine, are the coordinates of the transceiver node.

10. An anchor node for use in determining a position of at least one external transceiver node with respect to an at least two-dimensional coordinate space, the anchor node comprising:

a positioning anchor transceiver configured to receive and transmit positioning frames in exchange with external anchor nodes in performing a positioning sequence involving a plurality of anchor nodes, the positioning sequence comprising anchor node by anchor node, transmitting respective positioning frames suitable for reception by the transceiver node and by at least one other of the anchor nodes, and a given anchor node transmitting a respective positioning frame for reception by at least that anchor node, which is the next anchor node in the positioning sequence, and by the transceiver node, the next anchor node in the positioning sequence receiving the positioning frame from that anchor node, which is the preceding anchor node in the positioning sequence, and ascertaining a time of reception of the positioning frame, the next anchor node ascertaining, after transmitting its respective positioning frame, a respective forwarding time span (TFi) between the time of reception of the positioning frame from the preceding anchor node and the time of transmitting the its respective positioning frame; wherein the positioning anchor transceiver further configured to provide to an external solver engine for numerically solving a non-linear system of equations the following parameters ascertained in performing the positioning sequence:

the time of reception of the respective positioning frame transmitted by an external anchor node preceding in rank in the positioning sequence, the ascertained forwarding time span ($T_{Fi}$);

wherein the anchor node further comprises a second solver engine for numerically solving a non-linear system of equations, the second solver engine being configured to receive the following parameters:

the determined time is of transmission of the first positioning frame by the anchor node of first rank in the positioning sequence;

the sets of coordinates of the known positions of the external anchor nodes performing the positioning sequence, the respective times of reception of the broadcast positioning frame at the respective other external anchor nodes; wherein the second solver engine is configured, using the provided parameters, to determine the coordinates ($x_s$, $y_s$, $z_s$) of the transceiver node and the time $t_{ST}$ of transmission of the broadcast positioning frame by the at least one transceiver node, by numerically solving a second non-linear system of at least five equations for 3D localization, or at least four equations for 2D localization, of the nonlinear system using the relation $$t_m = t_{ST} + \frac{1}{c}\sqrt{(x_n - x_s)^2 + (y_n - y_s)^2 + (z_n - z_s)^2},$$

wherein $t_m$ is a time of reception of the broadcast positioning frame at a given anchor node n, $x_n$, $y_n$, $z_n$ are the coordinates of the position of anchor node n, $t_{ST}$, to be determined by the second solver engine, is a time of transmission of the broadcast positioning frame by the transceiver node, and $x_s$, $y_s$, $z_s$, to be determined by the second solver engine, are the coordinates of the transceiver node.

11. A positioning arrangement for determining a position of at least one transceiver node with respect to an at least two-dimensional coordinate space, the arrangement comprising at least four anchor nodes, wherein at least four anchor nodes are configured to jointly perform a positioning sequence comprising a given anchor node transmitting a respective positioning frame for reception by at least that anchor node, which is the next anchor node in the positioning sequence, and by the at least one transceiver node, the next anchor node in the positioning sequence receiving the positioning frame from that anchor node, which is the preceding anchor node in the positioning sequence, and ascertaining a time of reception of the positioning frame, the next anchor node ascertaining, after transmitting its respective positioning frame, a respective forwarding time span ($T_{Fi}$) between the time of reception of the positioning frame from the preceding anchor node and the time of transmitting the its respective positioning frame, wherein the anchor nodes are for use in determining a position of at least one external transceiver node with respect to an at least two-dimensional coordinate space, the anchor node comprising:

a positioning anchor transceiver configured to receive and transmit positioning frames in exchange with external anchor nodes in performing a positioning sequence involving a plurality of anchor nodes, the positioning sequence comprising anchor node by anchor node, transmitting respective positioning frames suitable for reception by the transceiver node and by at least one other of the anchor nodes, and a given anchor node transmitting a respective positioning frame for reception by at least that anchor node, which is the next anchor node in the positioning sequence, and by the transceiver node, the next anchor node in the positioning sequence receiving the positioning frame from that anchor node, which is the preceding anchor node in the positioning sequence, and ascertaining a time of reception of the positioning frame, the next anchor node ascertaining, after transmitting its respective positioning frame, a respective forwarding time span (TFi) between the time of reception of the positioning frame from the preceding anchor node and the time of transmitting the its respective positioning frame; wherein the positioning anchor transceiver further configured to provide to an external solver engine for numerically solving a non-linear system of equations the following parameters ascertained in performing the positioning sequence:

the time of reception of the respective positioning frame transmitted by an external anchor node preceding in rank in the positioning sequence, the ascertained forwarding time span ($T_{Fi}$);

wherein the anchor node further comprises a second solver engine for numerically solving a non-linear system of equations, the second solver engine being configured to receive the following parameters:

the determined time is of transmission of the first positioning frame by the anchor node of first rank in the positioning sequence;

the sets of coordinates of the known positions of the external anchor nodes performing the positioning sequence, the respective times of reception of the broadcast positioning frame at the respective other external anchor nodes; wherein the second solver engine is configured, using the provided parameters, to determine the coordinates ($x_s$, $y_s$, $z_s$) of the transceiver node and the time $t_{ST}$ of transmission of the broadcast positioning frame by the at least one transceiver node, by numerically solving a second non-linear system of at least five equations for 3D localization, or at least four equations for 2D localization, of the nonlinear system using the relation $$t_m = t_{ST} + \frac{1}{c}\sqrt{(x_n - x_s)^2 + (y_n - y_s)^2 + (z_n - z_s)^2},$$

wherein $t_m$ is a time of reception of the broadcast positioning frame at a given anchor node n, $x_n$, $y_n$, $z_n$ are the coordinates of the position of anchor node n, $t_{ST}$ to be determined by the second solver engine, is a time of transmission of the broadcast positioning frame by the transceiver node, and $x_s$, $y_s$, $z_s$, to be determined by the second solver engine, are the coordinates of the transceiver node.

12. A positioning arrangement for determining a position of at least one transceiver node with respect to an at least two-dimensional coordinate space, the arrangement comprising at least four anchor nodes, wherein at least four anchor nodes are configured to jointly perform a positioning sequence comprising a given anchor node transmitting a respective positioning frame for reception by at least that anchor node, which is the next anchor node in the positioning sequence, and by the at least one transceiver node, the next anchor node in the positioning sequence receiving the positioning frame from that anchor node, which is the preceding anchor node in the positioning sequence, and ascertaining a time of reception of the positioning frame, the next anchor node ascertaining, after transmitting its respective positioning frame, a respective forwarding time span ($T_{Fi}$) between the time of reception of the positioning frame from the preceding anchor node and the time of transmitting the its respective positioning frame, further comprising at least one transceiver node comprising a transceiver positioning unit for determining spatial coordinates indicative of a position of the transceiver node with respect to an at least two-dimensional coordinate space, the transceiver positioning unit comprising:

a positioning receiver configured to receive positioning frames transmitted by anchor nodes in performing a positioning sequence involving a plurality of anchor nodes and to ascertain respective times of reception for each of the received positioning frames, the positioning sequence comprising,
  anchor node by anchor node, transmitting respective positioning frames suitable for reception by the transceiver node and by at least one other of the anchor nodes, and
  a given anchor node transmitting a respective positioning frame for reception by at least that anchor node, which is the next anchor node in the positioning sequence, and by the transceiver node,
  the next anchor node in the positioning sequence receiving the positioning frame from that anchor node, which is the preceding anchor node in the positioning sequence, and ascertaining a time of reception of the positioning frame,
  the next anchor node ascertaining, after transmitting its respective positioning frame, a respective forwarding time span (TFi) between the time of reception of the positioning frame from the preceding anchor node and the time of transmitting the its respective positioning frame;

the transceiver positioning unit further comprising a solver engine for numerically solving a non-linear system of equations, the solver engine being configured to receive the following parameters:
  sets of coordinates of the known positions of the anchor nodes performing positioning sequence, the positioning sequence comprising,
  a set of times of flight ($t_{tof(i-1)i}$) between pairs of respective anchor nodes of neighboring ranks ((i−1) and i) in the positioning sequence, using their known positions and a known propagation speed of the positioning frames,
  the respective times of reception of the respective positioning frames at the respective anchor nodes performing the positioning sequence,
  the respective forwarding time spans ($T_{Fi}$) ascertained by the respective anchor nodes performing the positioning sequence, and
  the respective times of reception of the respective positioning frames from the anchor nodes at the transceiver node;

wherein the solver engine is configured, using the provided parameters, to determine coordinates ($x_s$, $y_s$, $z_s$) of the transceiver node and the time is of transmission of the first positioning frame by the anchor node of first rank in the positioning sequence by numerically solving a non-linear system of at least five equations, at least four equations of the nonlinear system using the relation $$t_n = t_s + \frac{1}{c}\sqrt{(x_n - x_s)^2 + (y_n - y_s)^2 + (z_n - z_s)^2} + t_{sn},$$

wherein
  $t_n$ is a time of reception of the respective positioning frame from a given anchor node of rank n in the positioning sequence at the transceiver node,
  $x_n$, $y_n$, $z_n$ are the coordinates of the position of anchor node of rank n in the positioning sequence, $$t_{sn} = \Sigma_{i=2}^{n}(t_{tof(i-1)i} + T_{Fi}),$$

$t_s$, to be determined by the solver engine, is a time of transmission of the positioning frame by the anchor node having the first rank in the positioning sequence, and
  $x_s$, $y_s$, $z_s$, to be determined by the solver engine, are the coordinates of the transceiver node,
wherein the positioning arrangement is configured to perform a method of determining a position of at least one transceiver node with respect to an at least two-dimensional coordinate space, the method comprising:
providing, at respective known spatial positions, at least four anchor nodes;
in performing a positioning sequence, anchor node by anchor node transmitting respective positioning frames suitable for reception by the at least one transceiver node and by at least one other of the anchor nodes, wherein the positioning sequence comprises
a given anchor node transmitting a respective positioning frame for reception by at least that anchor node, which is the next anchor node in the positioning sequence, and by the at least one transceiver node,
the next anchor node in the positioning sequence receiving the positioning frame from that anchor node, which is the preceding anchor node in the positioning sequence, and ascertaining a time of reception of the positioning frame, and
the next anchor node ascertaining, after transmitting its respective positioning frame, a respective forwarding time span ($T_{Fi}$) between the time of reception of the positioning frame from the preceding anchor node and the time of transmitting the its respective positioning frame;
the at least one transceiver node receiving the positioning frames transmitted by the anchor nodes and ascertaining respective times of reception for each of the received positioning frames;
providing to a solver stage for numerically solving a non-linear system of equations the following parameters:
sets of coordinates of the known positions of the anchor nodes performing the positioning sequence,
a set of times of flight ($t_{tof(i-1)i}$) between pairs of respective anchor nodes of neighboring ranks ((i−1) and i) in the positioning sequence, using their known positions and a known propagation speed of the positioning frames,
the respective times of reception of the respective positioning frames at the respective anchor nodes performing the positioning sequence,
the respective forwarding time spans ($T_{Fi}$) ascertained by the respective anchor nodes performing the positioning sequence, and
the respective times of reception of the respective positioning frames from the anchor nodes at the at least one transceiver node;
performing the solver stage, using the provided parameters, for determining the coordinates ($x_s$, $y_s$, $z_s$) of the respective transceiver node and the time is of transmission of the first positioning frame by the anchor node of first rank in the positioning sequence by numerically solving a non-linear system of at least five equations, at least four equations of the nonlinear system using the relation $$t_n = t_s + \frac{1}{c}\sqrt{(x_n - x_s)^2 + (y_n - y_s)^2 + (z_n - z_s)^2} + t_{sn},$$

wherein
- $t_n$ is a time of reception of the respective positioning frame from a given anchor node of rank n in the positioning sequence at the at least one transceiver node,
- $x_n, y_n, z_n$ are the coordinates of the position of anchor node of rank n in the positioning sequence, $$t_{sn} = \Sigma_{i=2}^{n}(t_{tof(i-1)i} + T_{Fi}),$$

- $t_s$, to be determined by the solver engine, is a time of transmission of the positioning frame by the anchor node having the first rank in the positioning sequence, and
- $x_s, y_s, z_s$, to be determined by the solver engine, are the coordinates of the transceiver node;

performing a positioning extension sequence including:
providing the determined time is of transmission of the first positioning frame by the anchor node of first rank in the positioning sequence to the anchor nodes involved in the positioning sequence;
after the positioning sequence has been performed by the anchor nodes, the at least one transceiver node broadcasting a broadcast positioning frame for reception by all anchor nodes;
the anchor nodes receiving the broadcast positioning frame from the transceiver node and ascertaining a respective time of its reception, using the time is of transmission of the first positioning frame by the anchor node of first rank in the positioning sequence as a common reference point in time;
providing to a second solver stage for numerically solving a non-linear system of equations using the following parameters:
the sets of coordinates of the known positions of the anchor nodes performing the positioning sequence,
the respective times of reception of the broadcast positioning frame at the respective anchor nodes, and
performing a second solver stage using the provided parameters, for determining the coordinates $(x_s, y_s, z_s)$ of the transceiver node and the time $t_{ST}$ of transmission of the broadcast positioning frame by the at least one transceiver node, by numerically solving a second non-linear system of at least five equations, at least four equations of the nonlinear system using the relation $$t_m = t_{ST} + \frac{1}{c}\sqrt{(x_n - x_s)^2 + (y_n - y_s)^2 + (z_n - z_s)^2},$$

wherein
- $t_m$ is a time of reception of the broadcast positioning frame at a given anchor node n,
- $x_n, y_n, z_n$ are the coordinates of the position of anchor node n,
- $t_{ST}$, to be determined by the second solver engine, is a time of transmission of the broadcast positioning frame by the transceiver node, and
- $x_s, y_s, z_s$, to be determined by the second solver engine, are the coordinates of the transceiver node.

* * * * *

UNITED STATES PATENT AND TRADEMARK OFFICE
CERTIFICATE OF CORRECTION

PATENT NO. : 10,015,632 B2  
APPLICATION NO. : 15/696506  
DATED : July 3, 2018  
INVENTOR(S) : Vladica Sark et al.

Page 1 of 1

It is certified that error appears in the above-identified patent and that said Letters Patent is hereby corrected as shown below:

In the Claims

1. At Column 21, Line 48, Claim 9, Line 57, please remove the word "is" and replace with --$t_s$--.

2. At Column 22, Line 49, Claim 10, Line 43, please remove the word "is" and replace with --$t_s$--.

3. At Column 24, Line 12, Claim 11, Line 63, please remove the word "is" and replace with --$t_s$--.

4. At Column 25, Line 56, Claim 12, Line 76, please remove the word "is" and replace with --$t_s$--.

5. At Column 26, Line 66, Claim 12, Line 151, please remove the word "is" and replace with --$t_s$--.

6. At Column 27, Line 26, Claim 12, Line 177, please remove the word "is" and replace with --$t_s$--.

7. At Column 28, Line 1, Claim 12, Line 187, please remove the word "is" and replace with --$t_s$--.

Signed and Sealed this  
Sixteenth Day of October, 2018

Andrei Iancu  
*Director of the United States Patent and Trademark Office*